United States Patent

[11] 3,589,704

[72] Inventor Frank J. Kurtz
Esopus, N.Y.
[21] Appl. No. 774,740
[22] Filed Nov. 12, 1968
[45] Patented June 29, 1971
[73] Assignee International Business Machines Corporation
Armonk, N.Y.

[54] HOLDERS FOR IRREGULARLY FORMED INTEGRATED CIRCUIT DEVICES

13 Claims, 3 Drawing Figs.

[52] U.S. Cl. .......... 269/7, 269/20
[51] Int. Cl. .......... B25b 11/00
[50] Field of Search .......... 269/20, 22, 309, 310, 321 W, 23, 7; 51/277

[56] References Cited

UNITED STATES PATENTS

| | | | |
|---|---|---|---|
| Re. 21,461 | 5/1940 | Toman | 269/22 |
| 2,192,133 | 2/1940 | Hagemeyer | 269/22 |
| 685,204 | 10/1901 | Ewen | 51/277 UX |
| 3,120,087 | 2/1964 | Holloway | 51/277 X |
| 3,210,894 | 10/1965 | Bentley | 51/277 X |

*Primary Examiner*—William S. Lawson
*Assistant Examiner*—Donald D. Evenson
*Attorneys*—Hanifin & Jancin and Robert Lieber

ABSTRACT: A fluid underlying or encasing a thin multilayer printed circuit device with an irregular underside structure provides uniform backing support for electrical probing of the device. In this instance the irregular structure is formed in relief from a main substrate board by joinder to the board of external circuit chip elements and discrete point-to-point connection wires. In one embodiment the device is clamped in a work holder with which it forms an airtight chamber. This chamber is filled to capacity with an incompressible dielectric fluid which supports the device and enables it to withstand substantial external forces as might be caused by the pressure of a matrix of test probes. Supply and vent valves are manipulated first to admit the fluid while releasing entrapped air and then to isolate the fluid when the chamber is filled so that external forces are transferred to the fluid only through the chamber wall formed by the device. The same valves are manipulated in reverse to remove fluid as one device is uncoupled from the fixture and replaced by another.

INVENTOR
FRANK J KURTZ

BY Robert Lieber
ATTORNEY

HOLDERS FOR IRREGULARLY FORMED INTEGRATED CIRCUIT DEVICES

BACKGROUND OF THE INVENTION

1. Field of the Invention

The invention pertains generally to the handling of planar integrated circuit devices having surface attachments or structures of irregular form and particularly to a method and, in one embodiment, associated work holder apparatus for providing uniform underlying fluid support enabling the device to safely withstand external pressure forces of electrical probes.

2. Description of the Prior Art

U.S. Pat. No. 3,294,661 to Maissel teaches flotation of printed circuit device articles on a fluid bed incidental to a coating process. U.S. Pat. No. 3,324,827 to Powell et al. teaches the use of rubber strips, or inflatable bags or tubes, to provide underlying support for plates used in a chromatography process. There does not however appear to be any teaching in the art of a method of providing uniform underlying support for an irregular surface of a planar circuit device to enable the device to withstand substantial pressure forces received at its opposite surface without deformation or damage. Nevertheless there is a definite need for development of such support techniques and the present invention is addressed to and satisfies this need.

SUMMARY OF THE INVENTION

The invention provides a method and, in one embodiment, associated work holder apparatus for providing uniform backing support along an irregular surface structure of a planar circuit device whereby the opposite surface of the device may be electrically probed. The method is based on coupling the device to an incompressible fluid medium preferably one with dielectric composition. In one instance the device and a holder form an airtight enclosure for the fluid medium. In another example the medium, represented by a waxlike substance hardened from a liquid state into a solid, forms a base and holder for the device. The wax in the second example is removed by melting the wax and then cleansing any residue wax with a dissolving substance which does not contaminate or damage the device.

Accordingly principal objects of the invention would be to provide:

a method of applying firm underlying support to an irregularly formed under surface structure of an integrated circuit device while the opposite surface of the device is being electrically probed;

means, in regard to the just named method, for detachably holding the said device in firm contact with an incompressible medium;

a fluid and preferably dielectric medium to supply the desired underlying support without contaminating or harming the underside structures of contacted devices and without altering circuit continuity at the exposed sides of said devices;

a solid but dissolvable dielectric medium to provide temporary underlying support and then separate from the device without damaging underside structures.

The foregoing and other objects, features and advantages of the invention will be apparent from the following more particular description of embodiments thereof as illustrated in the accompanying drawing.

DETAILED DESCRIPTION OF THE DRAWING

Figure 1:
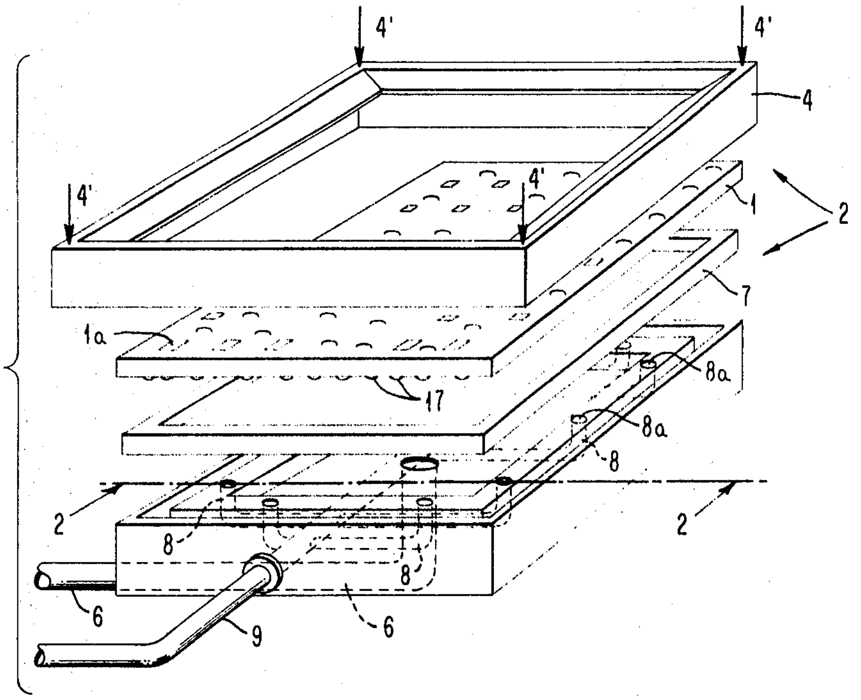
FIG. 1 contains an exploded perspective view, with some details in phantom, of an assembly of a circuit device and work holder apparatus in accordance with one preferred embodiment of the subject invention.
Figure 2:
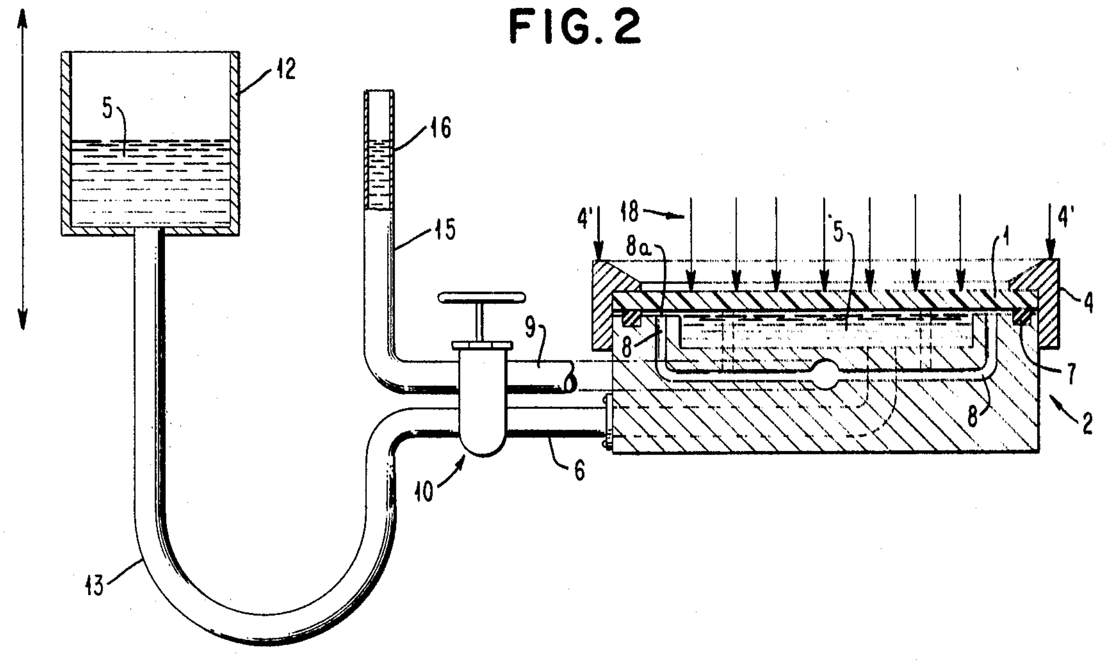
FIG. 2 contains an elevational sectional view of the just mentioned assembly taken along the lines 2–2 of FIG. 1. Additional parts of the work holder apparatus are also shown in elevation in this view; specifically extensions of the fluid supply and vent systems.

Referring to FIGS. 1 and 2 an illustrative embodiment is shown of an assembly of a circuit device and holder apparatus. This assembly is seen to comprise a laminar integrated circuit board member 1 with surface and interior conductive elements and active components bonded to pads 1*a* carried on the upper surface, together with holder apparatus generally indicated at 2. The latter engages the board, representing the device to be supported, through its holding element 4 which in turn is held down securely by clamping means suggested by arrows at 4'. An incompressible supporting fluid 5 (FIG. 2) is supplied through supply tubing means generally indicated at 6. The fluid chamber formed by the board 1 and holder apparatus 2 is sealed by a molded rubber sealing element 7 functioning as an O-ring. Entrapped air is vented from this chamber, while fluid is being admitted, by a system of vent ducts 8 indicated in phantom in FIG. 1. Ducts 8 communicate with the chamber through openings 8*a* adjacent the board understructure and feed entrapped air and excess fluid to a manifold collection duct 9.

Ganged valves 10 (FIG. 2) control simultaneous intake of fluid 5 into the support chamber through tube 6 and venting of entrapped air and excess fluid from the support chamber through the vent duct system 8*a*, 8, 9. The fluid when not in use is kept in a reservoir container 12 (FIG. 2) which is mounted for vertical movement in relation to the holder apparatus and associated support chamber. A flexible tube 13 connects the support chamber and reservoir to supply tube 6. A sight tube 15 (FIG. 2) connected to the vent duct system contains a transparent viewing portion 16 permitting indirect observation of the level of fluid in the support chamber. Presence of fluid at 16 indicates a completely fluid-filled and air-free support chamber.

Boards 1 require such fluid support if they have a fragile and irregular understructure which can not be safely supported by other means. In one particular case of interest a maze of discrete external wires, as suggested at 17 (FIG. 1), is soldered directly to the board underside in order to provide engineering change capability. Clearly such a board could not be clamped directly to a flat solid surface without risking damage to these wires.

In operation the board is placed in the holder apparatus 2 and clamped down securely by the holding means 4, 4' to form an enclosed support chamber. This chamber, in which the fluid 5 is initially established at a low level, is then filled from the reservoir container 12 by opening valves 10 and elevating container 12 above the holder apparatus. As the fluid fills the chamber completely to the level of the undersurface of board 2, under a slight pressure due to the elevation of container 12, entrapped air and excess fluid are passed out of the chamber through the vent system 8, 9, 15. Presence of vented fluid at viewing level 16 of sight tube 15 indicates that the chamber is completely devoid of air and filled with fluid, the latter in pressure equilibrium due to the balancing of pressure forces in the supply and vent systems.

At this point valves 10 are shut effectively sealing the fluid in the support chamber and isolating that fluid from external pressure forces other than forces transmitted through board 1. Being incompressible the fluid provides uniform and firm support for the irregular underside of board 1 while the latter is probed or otherwise manipulated. This arrangement is particularly effective when used in conjunction with a matrix of closely spaced probes capable of containing in parallel a large number of contact points on the upper surface of the board as suggested schematically at 18 (FIG. 2). The not inconsiderable forces exerted by such mass probing, which otherwise would cause bowing of the board and possibly damage its fragile understructure, are easily supported by the fluid 5 enclosed in the support chamber.

In addition to resisting compression fluid 5 should be physically compatible with the contacted materials on the board to avoid contamination or damage of the board underside structure. The fluid is also preferably a poor conductor of electricity so that undesired short circuits at the board undersurface are not created by its presence. Thus, I prefer to use as the support fluid any of the well-known low boiling point fluorocarbon liquids which are commonly used as heat exchange media in heat transfer systems. As is well known such liquids are poor conductors of electricity and generally inert in relation to the metals and solid dielectrics used in the undersurface construction of a board such as 1. It will be understood however that any liquid may be used that possesses requisite properties of noncontamination of contacted materials and poor electrical conduction.

It will be clearly understood that the utility of the work holder apparatus is not limited to probing support. Such apparatus is of course useful to provide support for the board during other operations; for example when soldering or bonding components to the exposed upper side of the board. In some of these applications the excellent heat transfer properties of a fluorocarbon support fluid could be used to additional advantage as a heat exchange medium to conduct heat rapidly away from the underside of the board.

Figure 3:
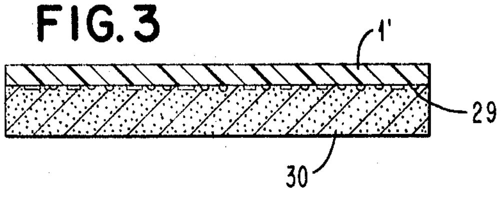
FIG. 3 is a sectional view of a second preferred embodiment of a device and supporting assembly constructed in accordance with the invention, wherein the supporting medium is a solidified wax adhered to the device in a compliant plastic condition and removed, when its support function has been accomplished, by replasticizing the solid wax and cleansing any residue with acetone.

Referring to FIG. 3 an alternate embodiment of the invention is shown in which the understructure 29 of a board 1' is adhered to or encapsulated in a low melting point dielectric material 30, such as the substance known in the jewelry trade as engraver's cement, while the latter is in a compliant or plastic state. The solidified wax provides a solid and flat base support for the combined board and wax assembly while the exposed upper surface of the device is electrically probed or otherwise treated or manipulated. The wax is easily removed by heating the assembly to the melting point of the wax in a suitable oven, then manually removing a major portion of the replasticized wax and then cleansing any residue of wax from the undersurface of the board with a suitable solvent. Acetone has been found to be quite satisfactory for this residue cleansing purpose.

We have shown and described above the fundamental novel features of the invention as applied to several preferred embodiments. It will be understood that various omissions, substitutions and changes in form and detail of the invention as described herein may be made by those skilled in the art without departing from the true spirit and scope of the invention. It is the intention therefore to be limited only by the scope of the following claims.

What I claim is:

1. The method of providing firm backing support for an electrical circuit device having delicate electrical structures supported on a backed surface thereof whereby substantial forwardly directed forces can be received unyieldingly on a surface thereof opposite said backed surface without risk of deformation or destruction of said delicate electrical structures, said medium having compliant and unyielding conditions of backing support which can be established selectively, said medium being a substance which is in a liquid state in both its compliant and unyielding conditions of support and said unyielding condition being established by:

first forming a chamber with said device incorporated as an element;

next feeding said liquid into said chamber, while allowing entrapped air and excess liquid to escape, thereby filling said chamber with said liquid in a compliant condition; and then locking said liquid in said chamber temporarily, by use of movable gating means, to establish said liquid temporarily in said unyielding condition.

2. The method of claim 1 wherein said substance is a poor conductor of electricity and wherein said step of locking said liquid in said chamber is followed by said applying of external forces, unlocking and removal of said liquid, and disassembly of said chamber.

3. A method of providing firm backing support for an electrical circuit device having a fragile and irregularly formed electrical underside structure, whereby said device may receive substantial external forces without damaging and without risk of damage to said underside structure, comprising successive steps of:

contacting a major portion of said underside structure with a compliant supporting medium which can be established alternately in compliant and unyielding conditions of backing support;

establishing said medium initially in said compliant condition while contact is made between said device underside structure and said medium;

establishing said medium in said unyielding condition; and applying said substantial forces to said device;

wherein said medium is a substance which is plastic when heated and fluid when cooled, and said compliant and unyielding conditions are established alternately by:

maintaining said substance in said plastic condition while initial contact is made with said device underside structure; and thereafter permitting said substance to cool to the solid condition.

4. The method of claim 3 wherein said substance is removed from said device by:

reheating said substance to said plastic condition;

manually removing a major portion of the substance while it is in said plastic condition; and chemically removing any residue of said substance with a solvent effective to dissolve the substance and yet not damage or contaminate said underside structure.

5. The method of claim 4 wherein said substance is the material commonly identified in the jewelry trade as engraver's cement, and said solvent is acetone.

6. Apparatus to provide firm underlying support for a circuit device having a fragile and irregularly formed underside structure, whereby said device may safely receive substantial external forces without deforming and without damage to said structure, comprising:

means for engaging said device to form a completely enclosed chamber;

movable gating means communicating with said chamber;

means to operate said gating means to opened and closed conditions; and means to supply an incompressible fluid to fill said chamber and simultaneously release entrapped air from said chamber through said opened gating means;

said fluid being in a compliant condition, when filling said chamber while said gating means is opened, and in an unyielding condition of support relative to said device when it fills said chamber and said gating means is closed.

7. Apparatus according to claim 6 wherein said fluid is a poor conductor of electricity.

8. Apparatus according to claim 7 wherein said fluid is a fluorocarbon liquid having a low boiling point.

9. Apparatus according to claim 6 wherein said fluid supply and air release means comprises a network of at least one fluid supply duct and at least two air-venting ducts, the latter ducts having openings in said chamber adjacent said device understructure and a common manifold duct.

10. Apparatus according to claim 9 wherein said gating means comprises manually controllable valves controlling flow of fluid in said supply duct and said manifold venting duct.

11. Apparatus according to claim 10 including sighting means coupled to said manifold venting duct through one of said valves permitting indirect visual observation of the level of fluid in said chamber.

12. Apparatus according to claim 11 including a container holding a supply of said fluid and means coupling said container to said supply duct through another of said valves for entering said fluid into said chamber.

13. Apparatus according to claim 12 wherein said last-mentioned coupling means is flexible and said container is mounted for vertical movement enabling it to be elevated and depressed to positions at which the level of fluid therein is respectively higher and lower than said vent duct openings in said chamber.